(12) United States Patent
Zoller et al.

(10) Patent No.: US 12,290,895 B2
(45) Date of Patent: May 6, 2025

(54) TOOL IDENTIFICATION CHIP

(71) Applicant: E. Zoller GmbH & Co. KG Einstell- und Messgeräte, Pleidelsheim (DE)

(72) Inventors: Alexander Zoller, Pleidelsheim (DE); Christoph Zoller, Pleidelsheim (DE)

(73) Assignee: E. ZOLLER GMBH & CO. KG EINSTELL- UND MESSGERAETE, Pleidelsheim (DE)

( * ) Notice: Subject to any disclaimer, the term of this patent is extended or adjusted under 35 U.S.C. 154(b) by 0 days.

(21) Appl. No.: 18/572,659

(22) PCT Filed: Jun. 21, 2022

(86) PCT No.: PCT/EP2022/066856
§ 371 (c)(1),
(2) Date: Dec. 20, 2023

(87) PCT Pub. No.: WO2022/268798
PCT Pub. Date: Dec. 29, 2022

(65) Prior Publication Data
US 2024/0286238 A1    Aug. 29, 2024

(30) Foreign Application Priority Data
Jun. 21, 2021    (DE) .................... 20 2021 103 316.9

(51) Int. Cl.
| | |
|---|---|
| B23Q 17/24 | (2006.01) |
| G06K 7/10 | (2006.01) |
| G06K 7/14 | (2006.01) |
| G09F 3/00 | (2006.01) |
| G09F 3/02 | (2006.01) |
| G09F 3/10 | (2006.01) |

(52) U.S. Cl.
CPC ..... *B23Q 17/2457* (2013.01); *G06K 7/10881* (2013.01); *G06K 7/1417* (2013.01); *G09F 3/0297* (2013.01); *G09F 3/10* (2013.01); *G06K 2007/10524* (2013.01); *G09F 2003/0202* (2013.01); *G09F 2003/0266* (2013.01)

(58) Field of Classification Search
None
See application file for complete search history.

(56) References Cited

U.S. PATENT DOCUMENTS

| | | |
|---|---|---|
| 2014/0190717 A1 | 7/2014 | Simpson |
| 2021/0201705 A1 | 7/2021 | Schadow et al. |

FOREIGN PATENT DOCUMENTS

| | | | | |
|---|---|---|---|---|
| DE | 102017216628 A1 | 3/2019 | | |
| EP | 829842 A1 * | 3/1998 | ............... | G09F 3/00 |

(Continued)

OTHER PUBLICATIONS

International Search Report and Written Opinion received in related International Application No. PCT/EP2022/066856, received Oct. 5, 2022, 21 pages.

(Continued)

*Primary Examiner* — Kristy A Haupt
(74) *Attorney, Agent, or Firm* — Womble Bond Dickinson (US) LLP

(57) ABSTRACT

A tool identification chip for an unambiguous marking of tools and/or tool holders is proposed, with a plate-like base body which has an adhesive side and a lettering side situated opposite the adhesive side.

16 Claims, 2 Drawing Sheets

(56) References Cited

FOREIGN PATENT DOCUMENTS

Figure 1:
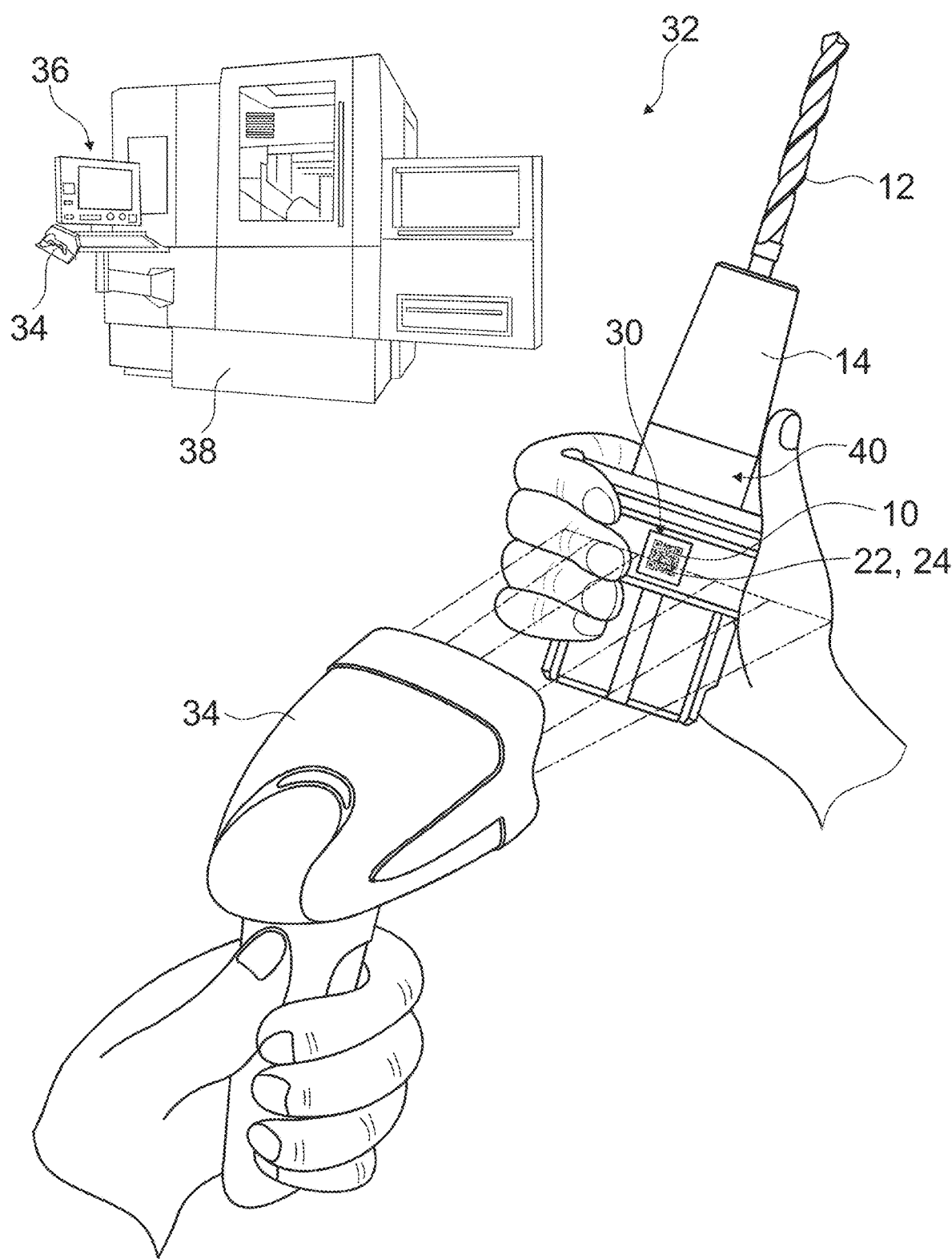

EP        1713624 B1    9/2007
WO     2012128735 A1   9/2012

OTHER PUBLICATIONS

International Preliminary Report on Patentability received in related International Application No. PCT/EP2022/066856, mailed Dec. 14, 2023, 14 pages.

* cited by examiner

TOOL IDENTIFICATION CHIP

CROSS-REFERENCE TO RELATED APPLICATIONS

This application is based on and incorporates herein by reference the German utility patent DE 20 2021 103 316.9, filed on Jun. 21, 2021, and the international patent application PCT/EP2022/066856, filed on Jun. 21, 2022.

PRIOR ART

The invention concerns a tool identification chip, a tool holder or a tool unit and a machining installation system.

The objective of the invention is in particular to provide a generic device having advantageous properties with regard to durability. The objective is achieved according to the invention.

Advantages of the Invention

A tool identification chip for the unambiguous marking of tools and/or tool holders is proposed, with a plate-like base body which has an adhesive side and a lettering side situated opposite the adhesive side. This advantageously allows achieving a high level of durability, in particular also under highly stressful conditions of a machining installation. Furthermore, cost-efficient tool identification is enabled, which in particular does not require electronics on the side of the tool and/or of the tool holder.

By a "tool holder" is in particular a component to be understood which is configured for receiving a tool and for connecting the tool to a machine. In particular, the tool holder is realized as a tool-machine interface. Preferably the tool holder is embodied as a tool chuck. The tool is in particular embodied as a shaft tool, preferably as a rotational shaft tool, for example as a drill, as a milling tool, as a profiling tool and/or as a reamer. The plate-like base body in particular has two opposite-situated, at least substantially planar side surfaces, which preferably extend parallel to each other. The planar side surfaces are in particular delimited all around by side edges. In particular, one of the planar side surfaces forms the adhesive side. In particular, the adhesive side is realized so as to be completely self-adhesive. In particular, the side surface opposite the adhesive side is realized free of glue and/or non-adhesive. In particular, the plate-like base body has a size of some millimeters to a few centimeters. For example, the base body has dimensions below 20 mm×20 mm×5 mm and above 5 mm×5 mm×0.5 mm.

It is further proposed that the lettering side is printed with a bijective identification code. This enables simple, easily accessible marking of the tool and/or the tool holder. The identification code is in particular linked with data of the tool and/or the tool holder, which are stored in at least one database, for example a database of a computer controlling device of a machining installation system.

If the lettering side is laser-inscribed, particularly high durability of the tool identification chip, in particular of the lettering on the lettering side of the tool identification chip, is advantageously achievable. In particular, the lettering side is laser-inscribed in one color (black).

In addition, it is proposed that the bijective identification code is realized as a 1D-barcode or as a 2D-barcode, like for example a QR code or a DataMatrix code. This advantageously enables simple and/or reliable marking of a plurality of different tools and/or tool holders.

Beyond this, an electronics-free implementation of the tool identification chip is proposed. This allows achieving a high level of reliability, a long lifespan and/or low production costs. In particular, the tool identification chip is free of RFID technology and/or fee of NFC technology or the like.

It is also proposed that the plate-like base body is realized at least substantially in a bending-resistant manner. This advantageously allows ensuring a high durability of the tool identification chip and/or a simple installation of the tool identification chip. Preferably the plate-like base body is made of a bending-resistant material.

If the plate-shaped base body is made of a synthetic material, in particular of a polyamide, like for example polycaprolactam (PA6), it is advantageously possible to attain high durability, in particular high oil resistance, and/or easy inscribability. Preferably the plate-like base body is made of a thermosetting polymer.

Furthermore, it is proposed that the plate-like base body is dyed in a color having a high contrast to a black lettering. This advantageously allows easy and/or reliable reading of the identification code. In particular, the black lettering comprises at least the identification code. In particular, the color of the plate-like base body has a lightness of more than 40%, preferably of more than 60% and preferentially of more than 80%. In particular, the black lettering on the dyed plate-like base body creates a contrast according to DIN 32975:2009-12 that is at least 0.4, preferably at least 0.7.

If the plate-like base body is yellow, a high contrast to a black lettering, in particular to a black identification code, is advantageously achievable.

Moreover, it is proposed that the plate-like base body has an at least substantially round (oval or circular) disk shape. This advantageously enables particularly simple assembly (which is at least partially independent from an orientation).

Alternatively thereto, it is proposed that the plate-like base body has a rectangle plate shape. In this way a high compactness of the tool identification chip is advantageously achievable, in particular if 1D-barcodes or 2D-barcodes are used as identification codes.

Furthermore, a tool holder and/or a tool unit with a glued-in tool identification chip are/is proposed. This advantageously allows attaining a high durability and reliability of the tool identification, in particular also under highly stressful conditions of a machining installation. Moreover, cost-efficient tool identification is advantageously enabled, which in particular does not require electronics on the side of the tool holder. A tool unit may be composed of components/individual parts, which can be composed before use and can be disassembled after use.

If the tool identification chip is glued within a bore or recess, which is in particular present in the tool holder by default, it is advantageously possible to achieve protected assembly and/or assembly having no influence on a machining process. In particular, the tool identification chip is glued within the tool holder offset inwards with respect to a rotation surface of the tool holder. In particular, the tool identification chip is glued within the tool holder in such a way that the tool identification chip, in particular the lettering side of the tool identification chip, is visible from the outside for a viewer and/or for a reading-out device.

If the bore or recess, in particular a surface of the bore or recess on which the tool identification chip is glued, is arranged sunk relative to a rotation surface of the tool holder and/or of the tool unit, it is advantageously possible to achieve protected assembly and/or assembly having no influence on a machining process.

If moreover the tool identification chip is glued within the tool holder and/or the tool unit by means of a two-component adhesive, it is advantageously possible to achieve simple assembly and/or high durability of the connection of the tool identification chip with the tool holder.

Furthermore, if the tool identification chip is glued within the tool holder and/or the tool unit by means of an oil-resistant adhesive, in particular an oil-resistant two-component adhesive, it is advantageously possible to achieve high durability under typical usage conditions of tools and tool holders.

Beyond this, a machining installation system is proposed, with a reading-out device for reading out identification codes, with a computer controlling device and with a plurality of tool holders and/or tool units. Advantageously, this allows attaining a tool organization that is particularly reliable and has particularly high operational safety. In particular, the computer controlling device is configured to transmit the tool holders and/or tools identified by the reading-out device to the machining installation system. "Configured" is in particular to mean specifically programmed, designed and/or equipped. By an object being configured for a certain function is in particular to be understood that the object fulfils and/or executes said certain function in at least one application state and/or operation state.

The tool identification chip according to the invention, the tool holder, the tool unit according to the invention and the machining installation system according to the invention shall herein not be limited to the application and implementation described above. In particular, in order to fulfil a functionality that is described here, the tool identification chip according to the invention, the tool holder, the tool unit according to the invention and the machining installation system according to the invention may comprise a number of individual elements, components and units that differs from a number given here.

DRAWINGS

Further advantages will become apparent from the following description of the drawings. In the drawings exemplary embodiments of the invention are illustrated. The drawings, the description and the claims contain a plurality of features in combination. Someone skilled in the art will purposefully also consider the features separately and will find further expedient combinations.

Figure 3:
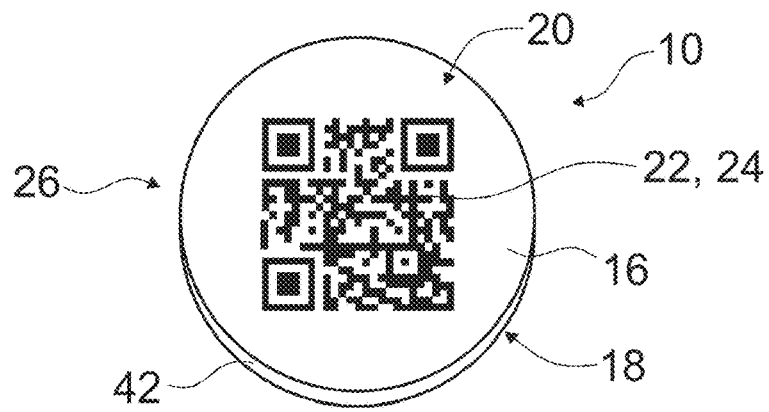
Figure 4:
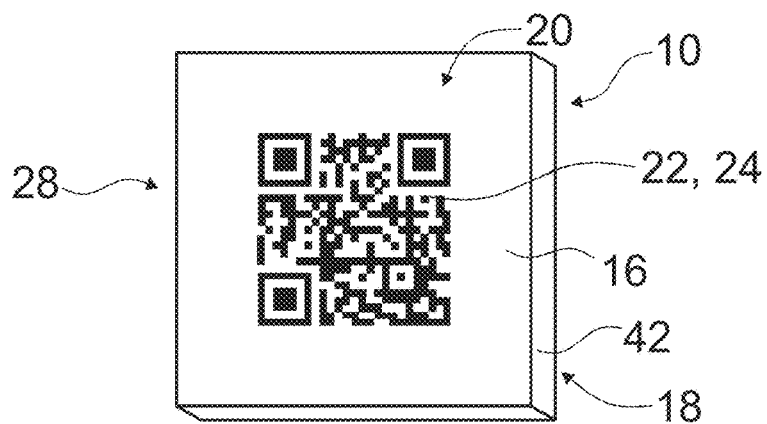

The figures show:
FIG. 1 illustrates schematically, a machining installation system,
FIG. 2 illustrates schematically, by way of example, a tool holder with a tool identification chip,
FIG. 3 illustrates schematically, a first exemplary implementation of the tool identification chip, and
FIG. 4 illustrates schematically, a second exemplary implementation of the tool identification chip.

DESCRIPTION OF THE EXEMPLARY EMBODIMENTS

FIG. 1 schematically shows a machining installation system 32. The machining installation system 32 comprises a machine tool 38. The machining installation system 32, in particular the machine tool 38 of the machining installation system 32, is configured for a machining of workpieces (not shown) by means of tools 12. The machining installation system 32 comprises a reading-out device 34 for reading out identification codes 22. The reading-out device 34 is embodied as a barcode reading device. The machining installation system 32 comprises a computer controlling device 36. The computer controlling device 36 is configured for a processing of the data obtained by the reading-out device 34. The computer controlling device 36 is configured to match the read-out identification codes 22 with entries in database, to enter the read-out identification codes 22 into databases, or the like. The machining installation system 32 comprises a plurality of tool holders 14. Alternatively or additionally, the machining installation system 32 may also comprise a plurality of tool units (not shown). The tool holders 14 are configured to be mounted in the machine tool 38. The tool holders 14 are configured for holding tools 12. The tools 12 held in the tool holders 14 and mounted in the machine tool 38 are configured for a machining of the workpieces.

Figure 2:
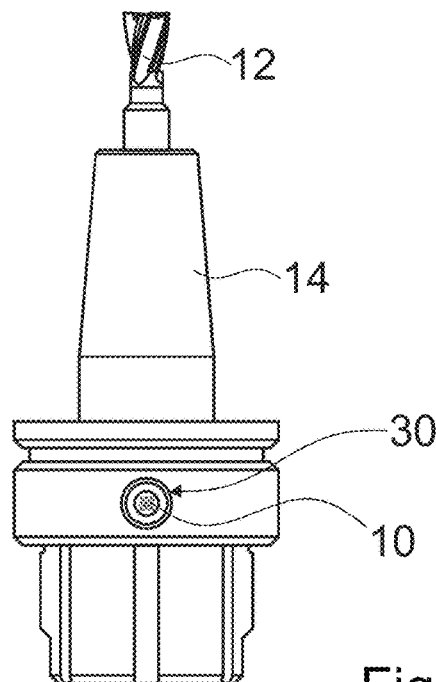

FIG. 2 schematically shows an exemplary tool holder 14. Other shapes and implementations of tool holders are of course also conceivable. A tool identification chip 10 is glued within the tool holder 14. The tool holder has a recess 30. The recess 30 is arranged sunk relative to a rotation surface of the tool holder 14. The recess 30 forms a planar bottom. The recess 30 is provided in the tool holder 14 by default. Usually each customary tool holder 14 has a surface contour that forms such a recess 30 (which may also be realized as a non-continuous bore or the like) and that is suitable for a sunk mounting of the tool identification chip 10. The tool identification chip 10 is glued within the recess 30, which is in particular present in the tool holder 14 by default. The tool identification chip 10 is glued within the tool holder 14, in particular the recess 30 of the tool holder 14. The tool identification chip 10 is glued within the tool holder 14, in particular the recess 30 of the tool holder, by means of an oil-resistant adhesive.

FIG. 3 schematically shows a first exemplary implementation of the tool identification chip 10. The tool identification chip 10 is configured for an unambiguous marking of the tool holders 14. The tool identification chip 10 has a plate-like base body 16. The plate-like base body 16 comprises an adhesive side 18. The adhesive side 18 is planar. The plate-like base body 16 comprises a lettering side 20. The lettering side 20 is planar. The lettering side 20 is arranged on the plate-like base body 16 opposite the adhesive side 18. The plate-like base body 16 has a side edge 42. The side edge 42 defines a thickness of the tool identification chip 10. The thickness of the side edge 42 exceeds customary film thicknesses. The thickness of the side edge 42 exceeds customary paper thicknesses. The plate-like base body 16 is realized in a bending-resistant manner. The plate-like base body 16 is made of a synthetic material. The plate-like base body 16 is made of polycaprolactam (PA6). The plate-like base body 16 is dyed in a color having a high contrast to a black lettering 24. The plate-like base body 16 is yellow. In the exemplary embodiment of FIG. 3, the plate-like base body 16 has a round disk shape 26.

The tool identification chip 10 is realized free of electronics. The lettering side 20 is printed with a bijective identification code 22. The lettering side 20 is laser-inscribed with the bijective identification code 22. In FIG. 3, the bijective identification code 22 is exemplarily realized as a QR code. Alternatively, however, the bijective identification code 22 may of course also be realized as a different one-dimensional or two-dimensional barcode, for example as a DataMatrix code.

FIG. 4 schematically shows a second exemplary implementation of the tool identification chip 10. Instead of the round disk shape 26 of FIG. 3, the plate-like base body 16 of the tool identification chip 10 of FIG. 4 has a rectangle plate shape 28. Alternatively, further shapes are conceivable, for example planar (platelet-like) polygonal shapes with more than four corners.

REFERENCE NUMERALS

10 tool identification chip
12 tool
14 tool holder
16 base body
18 adhesive side
20 lettering side
22 identification code
24 lettering
26 disk shape
28 rectangle plate shape
30 recess
32 machining installation system
34 reading-out device
36 computer controlling device
38 machine tool
40 outer side
42 side edge

The invention claimed is:

1. A tool identification chip for an unambiguous marking of rotational shaft tools and/or tool holders, which are realized as tool-machine interfaces and which are configured for receiving the rotational shaft tool and for connecting the rotational shaft tool to the tool-machine, with the tool identification chip comprising
   a plate-like base body which has an adhesive side and
   a lettering side situated opposite the adhesive side,
     wherein the lettering side is printed with a bijective identification code.

2. The tool identification chip according to claim 1, wherein the lettering side is laser-inscribed.

3. The tool identification chip according to claim 1, wherein the bijective identification code is realized as a 1D-barcode or as a 2D-barcode, like for example a QR code or a DataMatrix code.

4. The tool identification chip according to claim 1, having an electronics-free implementation.

5. The tool identification chip according to claim 1, wherein the plate-like base body is realized at least substantially in a bending-resistant manner.

6. The tool identification chip according to claim 1, wherein the plate-like base body is made of a synthetic material, in particular of a polyamide.

7. The tool identification chip according to claim 1, wherein the plate-like base body is dyed in a color having a high contrast to a black lettering.

8. The tool identification chip according to claim 7, wherein the plate-like base body is yellow.

9. The tool identification chip according to claim 1, wherein the plate-like base body has an at least substantially round disk shape.

10. The tool identification chip according to claim 1, wherein the plate-like base body has a rectangle plate shape.

11. A tool holder and/or tool unit with a glued-in tool identification chip according to claim 1.

12. The tool holder and/or tool unit according to claim 11, wherein the tool identification chip is glued within a bore or a recess, which is in particular present in the tool holder by default.

13. The tool holder and/or tool unit according to claim 12, wherein the bore or the recess is arranged sunk relative to a rotation surface of the tool holder and/or of the tool unit.

14. The tool holder and/or tool unit according to claim 11, wherein the tool identification chip is glued within the tool holder and/or within the tool unit by means of a two-component adhesive.

15. The tool holder and/or tool unit according to claim 11, wherein the tool identification chip is glued within the tool holder and/or within the tool unit by means of an oil-resistant adhesive.

16. A machining installation system with a reading-out device) for reading out identification codes, with a computer controlling system and with a plurality of tool holders and/or tool units according to claim 11.

* * * * *